United States Patent
Enzmann et al.

(10) Patent No.: US 6,516,203 B1
(45) Date of Patent: Feb. 4, 2003

(54) METHOD AND SYSTEM FOR PROVIDING ADDITIONAL INFORMATION TO A SUBSCRIBER BASED ON A UNIVERSAL RESOURCE LOCATOR

(75) Inventors: Mark J. Enzmann, Roswell, GA (US); Robert T. Moton, Jr., Alpharetta, GA (US); Samuel N. Zellner, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/468,887

(22) Filed: Dec. 22, 1999

(51) Int. Cl.[7] .............................. H04B 1/38; H04M 1/00
(52) U.S. Cl. ...................... 455/556; 709/219; 455/414; 455/445
(58) Field of Search ................. 455/556–557, 455/414, 415, 445, 418–419, 158.2–158.5; 709/219, 203, 217, 223–224, 927, 313, 328–329

(56) References Cited

U.S. PATENT DOCUMENTS

| | | | | |
|---|---|---|---|---|
| 6,067,546 A | * | 5/2000 | Lund ........................... | 707/10 |
| 6,112,099 A | * | 8/2000 | Ketola ......................... | 455/466 |
| 6,167,255 A | * | 12/2000 | Kennedy, III et al. ....... | 455/474 |
| 6,336,137 B1 | * | 1/2002 | Lee et al. .................... | 709/219 |
| 6,363,419 B1 | * | 3/2002 | Martin, Jr. et al. ......... | 709/219 |

* cited by examiner

Primary Examiner—Thanh Congle
Assistant Examiner—Tuan Tran
(74) Attorney, Agent, or Firm—Shaw Pittman LLP

(57) ABSTRACT

A system whereby subscribers are provided with a universal resource locator (URL), that uniquely identifies, e.g., a web site maintained by the calling party. In a preferred embodiment, when the telephone call reaches the subscriber's handset, a special character, e.g., an "*" is added to the display, e.g., at the end of the calling party's telephone number to let the subscriber know that additional information is available. The subscriber can then obtain detailed information about the calling party by, e.g., pressing a special "send" button on the handset, using a softkey or entering a special code. This establishes a link from the subscriber's telephone to a website on the internet maintained by the calling party. The subscriber's handset then downloads the information stored on the calling party's website for display on the subscriber's handset.

20 Claims, 4 Drawing Sheets

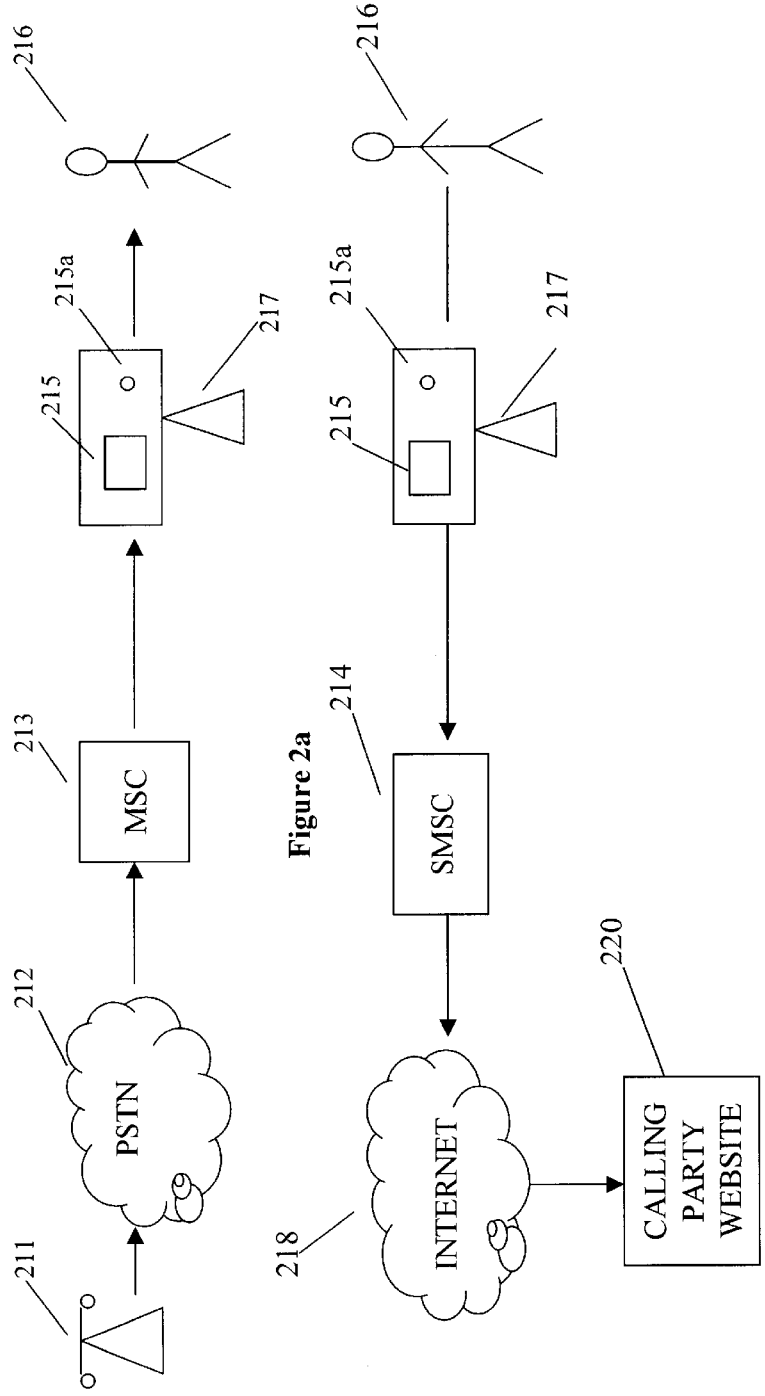
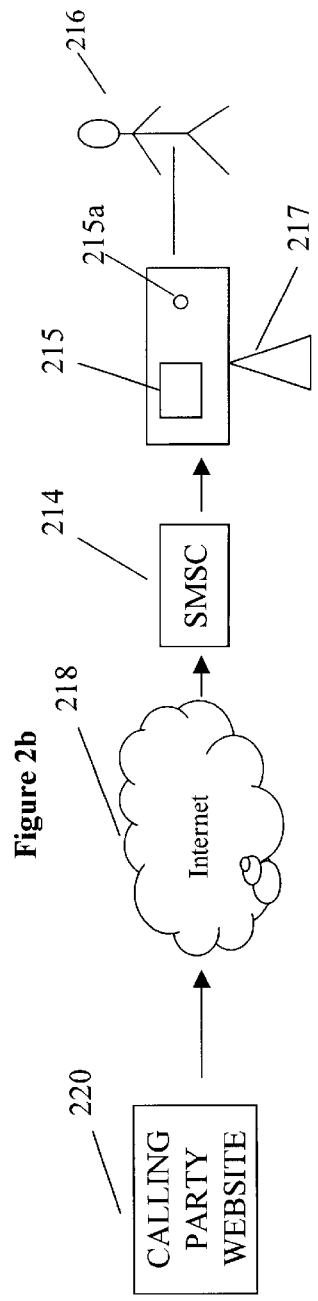
Figure 2a
Figure 2b
Figure 2c

METHOD AND SYSTEM FOR PROVIDING ADDITIONAL INFORMATION TO A SUBSCRIBER BASED ON A UNIVERSAL RESOURCE LOCATOR

BACKGROUND

1. Field of the Invention

The present invention relates generally to telecommunication systems and more particularly to a method and system for providing additional information associated with a calling party's telephone number.

2. Background of the Invention

Subscribers to telephone services often subscribe to services such as "caller ID" or "caller ID deluxe" that provide the subscriber with the telephone number or the name and telephone number, respectively, of the calling party. The telephone number and name of the calling party are usually shown on a display mounted on, or otherwise in communication with, the subscriber's telephone handset. An example of such a display is an LCD screen that displays one or more lines of information. Services such as caller ID or caller ID deluxe do not provide any way for the subscriber to receive any additional information that the calling party may want to provide to the subscriber.

SUMMARY OF THE INVENTION

The present invention provides subscribers with the ability to obtain additional information from the calling party. Subscribers to a service such as calling party ID can obtain additional information by downloading the additional information from a website maintained by the calling party. The calling party's telephone number is the universal resource locator (URL) for the website. In a preferred embodiment of the invention, when a telephone call reaches the subscriber's handset, the telephone network provides an indication, e.g., by adding a special character, for example, an "*", to the display, or by underlining all or part of the telephone number, or by showing a blinking number. For example, the network might add the "*" at the end of the calling party's telephone number. The "*" (or underlining or other indicator) notifies the subscriber that the calling party has made additional information available, and that additional information may be obtained by accessing a website (or possible another information source that could be identified using, in part, the calling party's telephone number). Preferably, the handset is a "smartphone" or a "browser phone" such as a W@P handset (a handset that meets the standards of the W@P forum, described below). However, the present invention will work with any communication device that allows two-way communication, such as cellular telephones, two-way pagers, caller ID boxes with two-way capability, ISDN telephones, VOIP telephones and POTS telephones with browser capabilities.

In a preferred embodiment of the invention, the subscriber requests the additional information by using a softkey or entering a special code that initiates the service. Alternatively, if the device has a special hard key that initiates the service, the subscriber just presses the hard key on the handset to request the service. The request activates a program on the handset that automatically initiates an internet protocol (IP) connection to, e.g., a web server or other database. Preferably, the program is a Java or Wireless Markup Language (WML) script program. The subscriber can initiate the request either while the telephone is ringing (before answering the call), during the call while the number is displayed (if the handset can simultaneously support a voice call and an IP session), or after recalling numbers of calling parties stored in the handset's memory (and noting that certain calling party numbers have an "*" at the end of the number).

The program initiates a request from the handset through the wireless network over the Internet to a website identified by the calling party's telephone number, i.e., the website's URL is the calling party's telephone number. The calling party maintains the website. The website will be referred to herein as the calling party's website. At this point, the subscriber's handset is in communication with the calling party's website. The subscriber's handset then downloads the information stored on the calling party's website for display on the subscriber's handset.

When the request includes the subscriber's telephone number as well as the calling party's telephone number, the information downloaded to the subscriber could depend on the subscriber's telephone number. For example, if the website is maintained by a construction company, it could be used to send one set of additional information to the company's engineers, another set to the contractors, and a third set to the suppliers. In another example, subscribers included in a list of telephone numbers stored at the website (e.g., the company's employees) could receive additional information that is different from the information that would be received by others. In these cases, requests from different groups of subscribers could be routed to different pages on the website.

Accordingly, the present invention provides calling parties with a fast and efficient method for providing additional information to subscribers using websites on the internet. It allows calling parties to add to, modify and/or delete the additional information independently of the telephone network. Furthermore, with the present invention, different subscribers may be directed to different URLs, depending on their telephone number.

BRIEF DESCRIPTION OF THE DRAWINGS

FIG. 2a is a schematic diagram showing the call flow when a calling party makes a telephone call to a subscriber having a telephone handset with display.

FIG. 2b is a schematic diagram showing the call flow connecting the subscriber to the calling party's website.

FIG. 2c is a schematic diagram showing the call flow when the information stored on the calling party's website is downloaded to the subscriber.

DETAILED DESCRIPTION OF THE INVENTION

Figure 1:
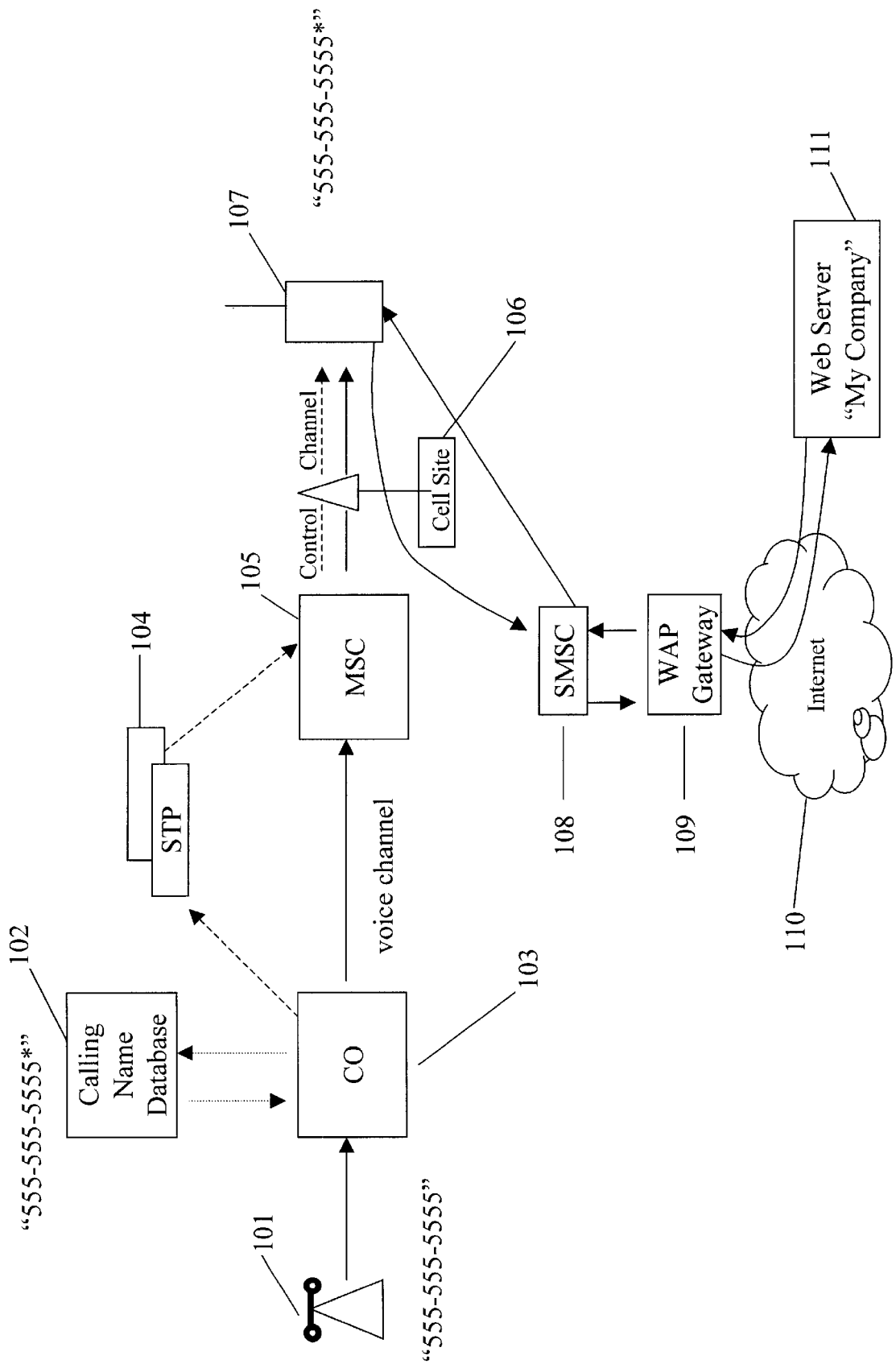
FIG. 1 is a schematic diagram of a preferred embodiment of the present invention.

FIG. 1 is a schematic diagram of a preferred embodiment of the present invention. A calling party uses her telephone 101 (that has, for example, the telephone number 555-555-5555) to place a call to a subscriber's communications device 107. Communications device 107 could be a handset, a computer, a computer in communication with a handset, or any other device, as listed above, that can display caller ID data. The call hits a trigger provisioned on the central office 103 that serves the calling party's telephone 101. The trigger has been set by the central office because the calling party has previously informed the central office that she would like to make additional information available to parties she calls. The trigger prompts a query from central office 103 to a calling party name database 102. Database 102 alters the display of the calling party's telephone number by, for example, adding a character, e.g., an "*", to the end of the calling party's telephone number and returns the telephone number with added character to the central office. The call is routed to communications device 107 over a voice channel via Mobile Switching Center (MSC) 105 and cell site 106. The telephone number, with the character added at the end, is sent to communications device (e.g., a handset) 107 over a control channel via Signaling Transfer Point (STP) 104, MSC 105 and cell site 106, and is displayed on the subscriber's handset. When the subscriber sees the character at the end of the telephone number, he knows that additional information associated with the calling party is available. If the subscriber requests that the additional information be delivered (by, for example, pressing a button or using a softkey or entering a special code), a browser on the handset establishes a communications link via cell site 106, SMSC 108, W@P gateway 109 and over internet 110 to the calling party's web server 111. As shown in FIG. 1, information can then be downloaded from the calling party's web server 111 over internet 110, via W@P gateway 109, SMSC 108 and cell site 106 to the subscriber's communications device 107 over a second communications link.

FIG. 2a is a chart detailing the call flow to a person having a telephone handset that is equipped with a display. As shown in FIG. 2a, a calling party 211 places a call over Public-Switched Telephone Network (PSTN) 212 via Mobile Switching Center (MSC) 13 to a subscriber 216 using a handset 217 equipped with a display 215 and a send button 215a. As used herein, "handset" shall include wireless cellular telephones, personal data assistants and pagers and other devices that are capable of displaying caller ID data. All these devices provide a communications link between the handset and the network. "Handset" shall also include landline (such as ISDN lines) telephones, as well as laptop computers or desktop computers that can receive and respond to telephone calls, and that allow for out-of-band signaling.

The present invention offers considerable flexibility in controlling the display on handset display 215. For example, display 215 on subscriber's handset 217 could show the telephone number of the calling party—e.g., 555-555-5555B—followed by a special character or code, e.g., a "*", at the end of the calling party's number as in the example described above. Thus the entire display in this example would be 5555555555*. The special character at the end of the calling party's telephone number would let the subscriber know that additional information is available to the subscriber. Alternatively, some or all of the numbers on the display could be underlined, or could blink to let the subscriber know that additional information is available. In a further embodiment of the present invention, if the present invention were to be so widely used that subscribers would not need to be informed that additional information might be available, the indication may no longer be needed. In that case, subscribers could enter the softkey (or press a button or use a special code) any time they believed that additional information might be available. If there is no additional information available, the network might respond with a message indicating that no information is available.

In a preferred embodiment of the present invention, if the subscriber wishes to receive this additional information, the subscriber uses a softkey or enters a special code or presses send button 215a on handset to request the additional information. As shown in FIG. 2b, handset 217 then sends the calling party's telephone number through SMSC 214 to Internet 218, which then uses the calling party's number as the URL for the calling party's website 220, e.g. the website's URL could be www.555-555-5555.com. (FIGS. 2a–2c refer to "websites" whereas FIG. 1 referred to "web servers." Essentially, a web server provides a website on the internet, i.e., there is a one-to-one correspondence of websites and web servers.) Calling party website 220 is now in communication with handset 217 and display 215. As shown in FIG. 2c, information stored at the calling party's website is then downloaded from the calling party's website for display on display 215.

In a preferred embodiment of the invention, handset 217 is a Wireless Application Protocol ("W@P") handset, such as a cellular telephone, a pager, a personal digital assistant, or other wireless terminal. Standards and protocols for W@P communications are described in W@P Wireless Application Protocol, published by the W@P Forum, 2570 West El Camino Real, Suite 304, Mountain View, Calif., 94040, and in the W@P Wireless Application Protocol White Paper, published in the June 1999 issue of Wireless Internet Today, which are incorporated herein in their entirety. Copies of these documents are attached hereto as an Appendix to the application. Preferred W@P handset 217 reaches Internet 218 via a W@P Gateway 109, which is an interface from the wireless system to the Internet.

Figure 3:
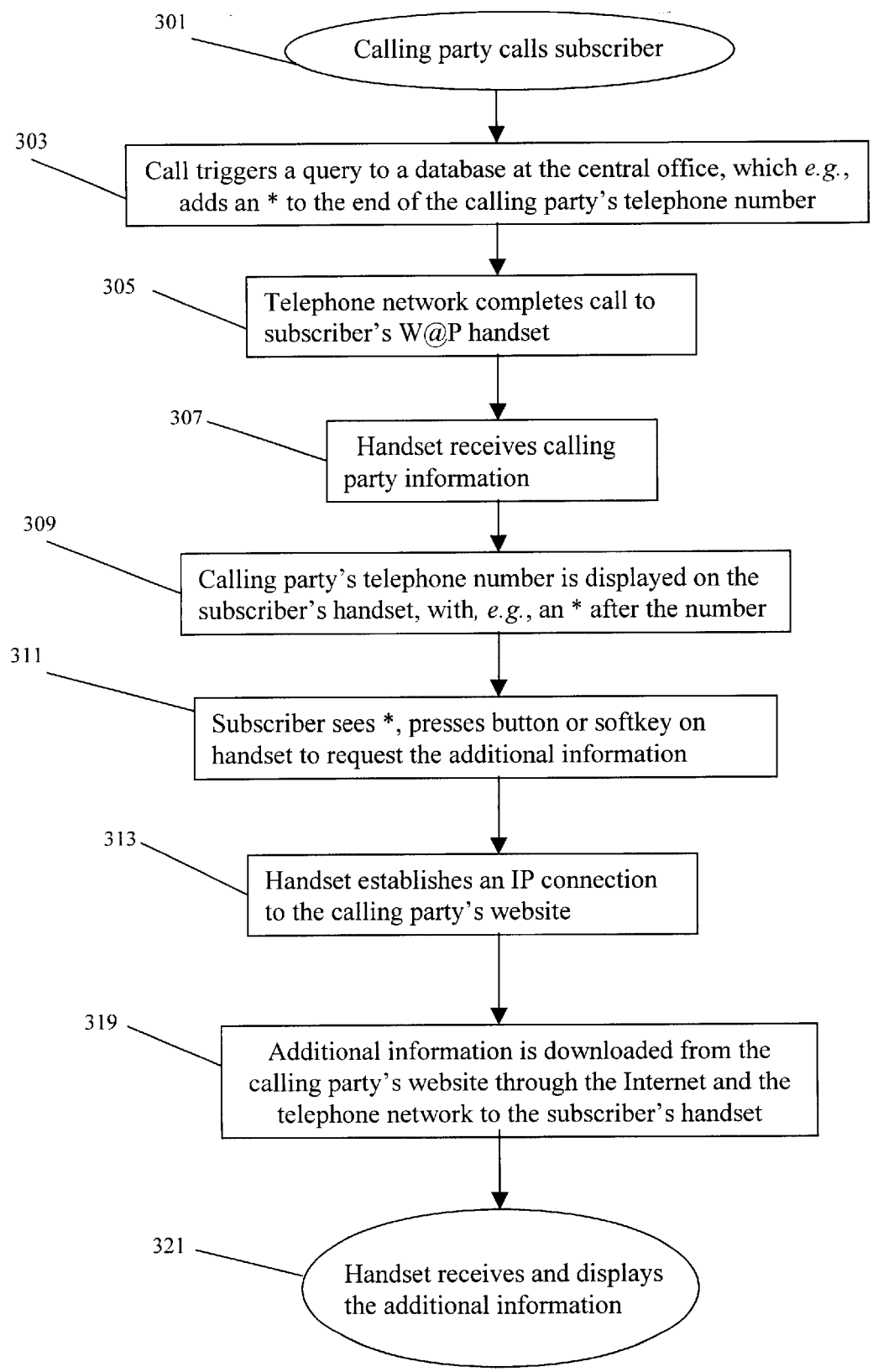
FIG. 3 shows an example of steps that could be used to implement the present invention.
Figure 4:
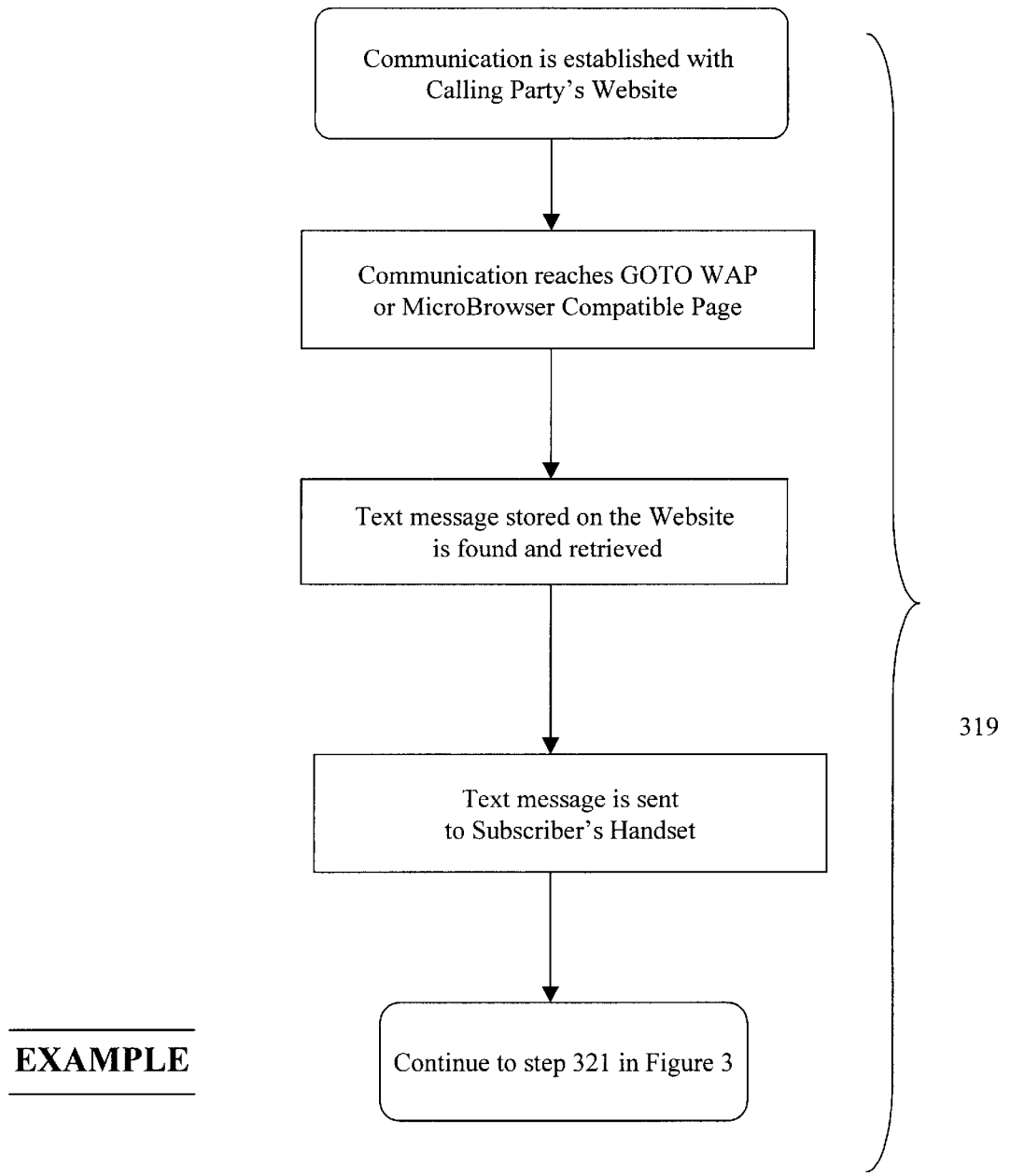
FIG. 4 is an example of steps for implementing step 319 of FIG. 3.

FIG. 3 and FIG. 4 are examples of the steps that could be used to implement the present invention. In step 301, a calling party (that has additional information stored on a website) places a call to a subscriber who has a handset, e.g., a W@P handset, that can receive additional information from a website on the internet. In step 303, the call triggers a query to a database at the central office serving the calling party's telephone, The database adds a special character, e.g., an "*", to the calling party's number (e.g., at the end of the calling party's number), and returns the number to the central office. In step 305, the telephone network completes the call to the subscriber's handset. In step 307, the handset receives information about the calling party, including the calling party's number with, e.g., an asterisk at the end of the number. In step 309, the calling party's number with (in this example) the asterisk at the end of the number is displayed on the subscriber's handset. In step 311, the subscriber presses a button or uses a softkey or enters a special code on the handset to request the additional information. In step 313, the handset establishes an IP communication channel over the internet to the web server on the internet to the calling party's website (which has the calling party's telephone number as its URL). In step 315, the URL web server identifies the website associated with the calling party's telephone number. In step 317, the URL web server redirects the communication to the calling party's web server. In step 319, additional information maintained by the calling party on its web server is downloaded over the internet and the telephone network to the subscriber's handset. In step 321, the subscriber receives the information on his or her handset.

FIG. 4 is an example of the steps that could be used to implement step 319. After the communication is established with the calling party's website, the communication is directed to a page on the website that is compatible with the GOTO W@P or MicroBrowser protocol. The website then sends the additional information from the website to the subscriber's handset. Preferably, the information retrieved from the website is a message that is suitable for display on the handset display 215 (shown in FIGS. 2a–2c), and complies with the size and other limitations required by the handset and its display. For example, short messages could be shown in their entirety. Longer messages may have to be scrolled to be viewed on the display.

In a second preferred embodiment of the present invention, the handset is in communication with a computer, e.g., a laptop or desktop computer, and the information is downloaded through the handset to the computer. Alternatively, the handset is a laptop or desktop computer that can receive and respond to telephone calls.

The calling party has control over the information on the web site. For example, the calling party may direct the subscriber to a generic web site, intended to be accessed by the general public. Alternatively, the website may be designed specifically only for pre-selected individuals or organizations. In that case, the website may require entry of a personal identification number or a password before the additional information can be downloaded from the website to the handset. For example, a marketing representative may call a number of prospective customers, and direct them to a specific web site designed for those specific customers. As another example, the head of a project may leave instructions for members of his team at a web site, and the members of his team could be directed to the website. As discussed above, the calling party websites may also require entry of personal identification numbers, a password or another special code, to ensure that only authorized persons may have access to the website.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for providing additional information from a calling party having a telephone number to a subscriber comprising:
   (a) providing a control signal to the subscriber during routing of a telephone call from the calling party to the subscriber, wherein the control signal includes the calling party's telephone number and an indicator for indicating that additional information associated with the calling party is available;
   (b) at the subscriber's request, requesting information from a website having the calling party's telephone number as its universal resource locator;
   (c) linking the subscriber to the website; and
   (d) downloading the information from the website to the subscriber.

2. The method of claim 1, wherein the subscriber receives the additional information on a handset.

3. The method of claim 2, wherein the handset comprises a send button, and wherein the subscriber requests the additional information by activating the send button.

4. The method of claim 2, wherein the subscriber requests the additional information by using a softkey.

5. The method of claim 2, wherein the handset is a handset that complies with the Wireless Application Protocol.

6. The method of claim 2, wherein the handset is a computer.

7. The method of claim 2, wherein the subscriber requests the additional information by entering a special code on the handset.

8. A communications device for providing information associated with a calling party to a subscriber comprising:
   (a) a handset adapted to display a telephone number of a calling party on a display;
   (b) an indication on the display indicating that additional information associated with the calling party is available to the subscriber, wherein a control signal to provide the indication is received at the handset during routing of a telephone call from the calling party; and
   (c) a communications link from the handset to a website having the calling party's telephone number as its universal resource locator, said website containing additional information,
      wherein the additional information is downloaded from the website to the handset over the communications link.

9. The system of claim 8, wherein the handset is a handset that complies with the Wireless Application Protocol.

10. The system of claim 8, wherein the handset is one of a wireless cellular telephone, a personal data assistant, and a pager.

11. The system of claim 8, wherein the website requires entry of a personal identification number or a password before the additional information is downloaded from the website to the handset.

12. The system of claim 8, wherein the handset comprises a send button that the subscriber can press to activate the communications link from the handset to the website.

13. The system of claim 8, wherein the communications link from the handset to the website is activated by entry of a string of characters.

14. A method for receiving Internet-based information associated with a calling party in response to a request from a party called by the calling party, comprising the steps of:
   receiving a control signal at a called party's communications device during routing of a telephone call from the calling party to the called party, wherein the control signal includes a telephone number of the calling party and an indicator for prompting the called party to receive Internet-based information associated with the calling party;
   transmitting a request to receive the calling party's associated Internet-based information in response to a prompt received on the called party's communications device, wherein the request is a URL comprising the telephone number of the calling party; and
   accessing information from a website corresponding to the URL.

15. The method of claim 14, wherein the called party accesses the website from a handset on the calling party's communications device.

16. The method of claim 14, wherein the called party's communications device is a computer.

17. The method of claim 14, wherein a telephone number for the called party is included in the URL request, and wherein different information is selected to be provided according to both telephone numbers included in the URL.

18. The method of claim 14, wherein a record of each attempted call from a calling party is stored in a log, and wherein the log additionally stores an indication that Internet-based information associated with the calling party is available, such that the subscriber is enabled to access information from a website associated with the calling party after a call to the called party has been made.

19. A method for receiving Internet-based information associated with a calling party in response to a request from a subscriber called by the calling party, comprising the steps of:

receiving a control signal at a subscriber's communications device during routing of a telephone call from the calling party to the subscriber, wherein the control signal includes a telephone number of the calling party and an indicator for prompting the subscriber to receive Internet-based information associated with the calling party;

transmitting a request to receive the calling party's associated Internet-based information in response to a prompt received on the subscriber's communications device, wherein the request is a URL comprising telephone numbers for both the calling party and the subscriber; and accessing information from a website corresponding to the URL, wherein different information is selected to be provided depending upon the telephone number of the subscriber.

20. A system for providing Internet-based information associated with a calling party in response to a request from a subscriber called by the calling party, comprising:

a subscriber's communications device for voice communications and for accessing information over an Internet connection, the communications device including a prompt for indicating when Internet-based information associated with a calling party can be received; and a telecommunications network for (i) transmitting a control signal to the subscriber's communications device during routing of a telephone call from the calling party to the subscriber, wherein the control signal includes a telephone number of the calling party and an indicator for prompting the subscriber to receive Internet-based information associated with the calling party, and for (ii) transmitting a request from the subscriber to receive the calling party's associated Internet-based information in response to a prompt received on the subscriber's communications device, wherein the request is a URL comprising the telephone number of the calling party.

* * * * *